US012071195B2

United States Patent
Yoshida (10) Patent No.: US 12,071,195 B2
(45) Date of Patent: Aug. 27, 2024

(54) DAMPER APPARATUS

(71) Applicant: Hitachi Astemo, Ltd., Hitachinaka (JP)

(72) Inventor: Kojiro Yoshida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 381 days.

(21) Appl. No.: 17/470,082

(22) Filed: Sep. 9, 2021

(65) Prior Publication Data

US 2021/0403119 A1     Dec. 30, 2021

Related U.S. Application Data

(63) Continuation of application No. PCT/JP2019/016733, filed on Apr. 19, 2019.

(51) Int. Cl.
*B62K 25/28*   (2006.01)
*F16F 9/44*    (2006.01)
*F16F 13/00*   (2006.01)

(52) U.S. Cl.
CPC ............ *B62K 25/283* (2013.01); *F16F 9/44* (2013.01); *F16F 13/007* (2013.01);
(Continued)

(58) Field of Classification Search
CPC  B62K 25/283; B62K 25/286; B62K 2201/08; F16F 13/007; F16F 9/44;
(Continued)

(56) References Cited

U.S. PATENT DOCUMENTS 1,571,788 A * 2/1926 Bramlette, Jr. ........... F16F 9/54
                                                 188/129
8,261,895 B2 * 9/2012 Murakami .............. F16F 9/461
                                                 280/124.179
(Continued)

FOREIGN PATENT DOCUMENTS

JP     55-152833 U     11/1980
JP     62-075237 U     5/1987
(Continued)

OTHER PUBLICATIONS

Translation of Japanese Patent No. JPH 11287279 obtained from website: https://worldwide.espacenet.com on Dec. 11, 2023.*
(Continued)

*Primary Examiner* — Pamela Rodriguez
(74) *Attorney, Agent, or Firm* — Leason Ellis LLP; Edward J. Ellis; Melvin C. Garner (57) ABSTRACT

A damper apparatus includes an adjusting bolt including a head part rotatably stored in an adjusting bolt storage part formed in a base part, and a male thread part including a tip end formed in a male thread shape. An adjusting member includes: a female thread part, which is a part in a female thread shape fastened to the male thread part of the adjusting bolt and movably provided along an axis line of the adjusting bolt; a tapered surface part with which the tip end of a push rod comes into contact and formed in a tapered shape with respect to the axis line of the adjusting bolt; and wall parts rising from both ends of the tapered surface part with reference to the circumferential direction of the adjusting bolt, and interposing the push rod therebetween.

13 Claims, 9 Drawing Sheets

(52) U.S. Cl.
CPC ..... *F16F 2222/12* (2013.01); *F16F 2228/066* (2013.01); *F16F 2230/186* (2013.01); *F16F 2232/08* (2013.01); *F16F 2234/02* (2013.01)

(58) Field of Classification Search
CPC ............. F16F 2234/02; F16F 2228/066; F16F 2230/186; F16F 2232/08; F16F 2222/12; F16F 9/182; F16F 9/466
See application file for complete search history.

(56) References Cited

U.S. PATENT DOCUMENTS

| | | | | |
|---|---|---|---|---|
| 2009/0266656 A1* | 10/2009 | Murakami | ............. | B62K 25/08 |
| | | | | 280/5.503 |
| 2009/0266657 A1 | 10/2009 | Murakami | | |
| 2010/0148412 A1* | 6/2010 | Murakami | ................ | F16F 9/44 |
| | | | | 267/118 |

FOREIGN PATENT DOCUMENTS

| | | | |
|---|---|---|---|
| JP | 11-287279 | A | 10/1999 |
| JP | 2007-170654 | A | 7/2007 |
| JP | 2007-177877 | A | 7/2007 |
| JP | 2009-264561 | A | 11/2009 |

OTHER PUBLICATIONS

International Search Report mailed Jul. 2, 2019 for the corresponding PCT International Patent Application No. PCT/JP2019/016733.

* cited by examiner

DAMPER APPARATUS

CROSS-REFERENCE TO RELATED APPLICATION(S)

This application is a Continuation of PCT Application No. PCT/JP2019/016733, filed on Apr. 19, 2019, the content of which is incorporated herein by reference in its entirety.

FIELD OF THE INVENTION

The present invention relates to a damper apparatus capable of adjusting a damping force.

BACKGROUND OF THE INVENTION

Technique disclosed in Patent Literature 1 relates to a damper apparatus capable of adjusting a damping force.

As shown in Patent Literature 1, a hydraulic shock absorber as a damper apparatus includes a cylinder including a vehicle body-side mounting part, a piston rod including a wheel-side mounting part and formed in a hollow shape, a piston fixed to an end of the piston rod, a suspension spring provided between the cylinder and the piston rod, an adjusting rod inserted into the hollow part of the piston rod, an adjuster bolt press-fitted into the wheel-side mounting part, and an adjuster provided at a tip of the adjuster bolt.

A tapered surface is formed on the adjuster, and the adjusting rod is in contact with the tapered surface. A bypass flow path is open at the tip of the piston rod to intersect the hollow part.

In order to prevent the adjuster from rotating together with the adjuster bolt, a groove parallel to the axis line of the adjuster bolt is formed in the adjuster, and the tip of the guide bolt fixed to the wheel-side mounting part faces the groove.

By rotating the adjuster bolt, the adjuster is moved along the axis line of the adjuster bolt. As the tapered surface is moved relative to the adjusting rod, the adjusting rod in contact with the tapered surface is moved up and down in the piston rod. The degree of opening of the bypass flow path is adjusted by the position of the adjusting rod. As a result, the flow rate of oil flowing through the piston is determined, and the damping force generated by the piston is determined.

Patent Literature 1: JP-A-11-287279

According to the hydraulic shock absorber shown in Patent Literature 1, a guide bolt is provided to prevent the rotation of the adjuster. The number of parts of the hydraulic shock absorber, that is, the damper apparatus, is increased as many as the number of the guide bolts is required.

An object of the present invention is to provide a damper apparatus having a small number of parts.

SUMMARY OF THE INVENTION

As a result of diligent studies, the present inventors have found that the rotation of the adjusting member is prevented with the push rod by having the wall parts rising from both ends of the tapered surface part and interposing the push rod between these wall parts. The present invention has been completed based on such finding.

Hereinafter, the present invention will be described. In the following description, reference numerals in the accompanying drawings are added in parenthesis in order to help easy understanding of the present invention, but the present invention is not limited to the illustrated forms.

According to one aspect of the present invention, there is a provided a damper apparatus (20, 20A, 20B) including:
a tubular member (31) filled with oil inside;
a base part (41, 41A, 41B) disposed outside the tubular member (31), movably provided on an axis line (CL1) of the tubular member (31), and including an adjusting bolt storage part (41b, 41bA, 41bB) opening perpendicularly to the axis line (CL1) of the tubular member (31);
a rod (42) supported by the base part (41, 41A, 41B) and provided along the axis line (CL1) of the tubular member (31), the rod including a tip located inside the tubular member (31) and formed with a vertical hole part (42a) penetrating along the axis line (CL1) of the tubular member (31) and a horizontal hole part (42b) located inside the tubular member (31) and penetrating perpendicularly to the axis line (CL1) of the tubular member (31);
a piston (23) provided at the tip of the rod (42) and generating a damping force when the rod (42) is moved forward and backward;
a spring (25) urging the tubular member (31) and the base part (41, 41A, 41B) to be separated from each other;
a push rod (43) movably provided in the vertical hole part (42a) along the axis line (CL1) of the tubular member (31), opening the horizontal hole part (42b) when positioned at a retreat limit and closing the horizontal hole part (42b) when positioned at an advance limit;
an adjusting bolt (50, 50A, 50B) including a head part (51) rotatably stored in the adjusting bolt storage part (41b, 41bA, 41bB) and a tip being a male thread part (52) formed in a male thread shape; and
an adjusting member (60, 60A, 60B) including a female thread part (61), which is a part in a female thread shape fastened to the male thread part (52) of the adjusting bolt (50, 50A, 50B) and movably provided along an axis line (CL2) of the adjusting bolt (50, 50A, 50B), a tapered surface part (62, 62A, 62B) with which a tip of a push rod (43) comes into contact and which is formed in a tapered shape with respect to the axis line (CL2) of the adjusting bolt (50, 50A, 50B), and wall parts (63, 63) rising from both ends of the tapered surface part (62, 62A, 62B) with reference to the circumferential direction of the adjusting bolt (50, 50A, 50B) and interposing the push rod (43) therebetween.

The adjusting bolt (50) may include a groove part (53) formed in a groove shape in the circumferential direction and including concave parts (53c) formed at predetermined intervals on the bottom surface (53a),
the base part (41, 41B) may include a storage hole part (41d) opening along the axis line (CL1) of the tubular member (31) and facing the groove part (53), and
the storage hole part (41d) may store a retaining member (46) extending to the groove part (53) and preventing the adjusting bolt (50) from coming off from the base part (41, 41B) and an urging member (47) urging the retaining member (46) toward the bottom surface (53a) of the groove part (53).

The adjusting bolt (50) may include a groove part (53) formed in a groove shape in the circumferential direction and including convex parts (53d) formed at predetermined intervals on a bottom surface (53a) or a side surface (53b),
the base part (41, 41B) may include a storage hole part (41d) opening along the axis line (CL1) of the tubular member (31) and facing the groove part (53), and
the storage hole part (41d) may store a retaining member (46) extending to the groove part (53) and preventing the adjusting bolt (50) from coming off from the base part (41, 41B) and an urging member (47) urging the retaining member (46) toward the bottom surface (53a) of the groove part (53).

A tip of the retaining member (46) may be formed in a spherical shape.

The base part (41A) may include a small-diameter hole part (41f) being a cylindrical hole storing the head part (51) and a large-diameter hole part (41g) being a cylindrical hole storing the male thread part (52) and having an inner diameter larger than an inner diameter larger of the small-diameter hole part (41f), the adjusting bolt (50A) may include a flange part (55) radially protruding between the head part (51) and the male thread part (52) and being larger than the inner diameter of the small-diameter hole part (41f) and smaller than the inner diameter of the large-diameter hole part (41g), the flange part (55) may come into contact with a stepped portion (41h) formed at a boundary between the small-diameter hole part (41f) and the large-diameter hole part (41g), and the tapered surface part (62A) may be formed with a downward slope in a direction away from the flange part (55).

The adjusting bolt storage part (41bB) may penetrate the base part (41B), one end of the adjusting bolt storage part (41bB) may be closed by the head part (51), and the other end of the adjusting bolt storage part (41bB) may be closed by a lid part (65) integrally formed with a tip of the adjusting member (60).

The tapered surface part (62B) may be formed with a downward slope toward the lid part (65).

According to another aspect of the present invention, there is provided a damper apparatus (20) including:

a tubular member (31) filled with oil inside;

a base part (41) disposed outside the tubular member (31), movably provided on an axis line (CL1) of the tubular member (31), and including an adjusting bolt storage part (41b) opening perpendicularly to the axis line (CL1) of the tubular member (31) and a storage hole part (41d) opening along the axis line (CL1) of the tubular member (31);

a rod (42) supported by the base part (41) and provided along the axis line (CL1) of the tubular member (31), the rod including a tip located inside the tubular member (31) and formed with a vertical hole part (42a) penetrating along the axis line (CL1) of the tubular member (31) and a horizontal hole part (42b) located inside the tubular member (31) and penetrating perpendicularly to the axis line (CL1) of the tubular member (31);

a piston (23) provided at the tip of the rod (42) and generating a damping force when the rod (42) is moved forward and backward;

a spring (25) urging the tubular member (31) and the base part (41) to be separated from each other;

a push rod (43) movably provided in the vertical hole part (42a) along the axis line (CL1) of the tubular member (31), opening the horizontal hole part (42b) when positioned at a retreat limit, and closing the horizontal hole part (42b) when positioned at an advance limit;

an adjusting bolt (50) including a head part (51) rotatably stored in the adjusting bolt storage part (41b), a male thread part (52) including a tip formed in a male thread shape, and a groove part (53) formed in a groove shape in the circumferential direction, in which a bottom surface (53a) of the groove part (53) is formed with concave parts (53c) concaved toward a center at predetermined intervals;

an adjusting member (60) including a female thread part (61) fastened to the male thread part (52) of the adjusting bolt (50) and movably provided along an axis line (CL2) of the adjusting bolt (50), a tapered surface part (62) with which a tip of the push rod (43) comes into contact and which is formed in a tapered shape with respect to the axis line (CL2) of the adjusting bolt (50), and a wall part rising from both ends of the tapered surface part (62) with reference to the circumferential direction of the adjusting bolt (50) and interposing the push rod (43) therebetween;

a retaining member (46) including a base stored in the storage hole part (41d) and a tip formed in a spherical shape stored in the groove part (53) to prevent the adjusting bolt (50) from coming off the base part (41); and an urging member (47) stored in the storage hole part (41d) and urging the retaining member (46) toward the bottom surface (53a) of the groove part (53).

According to an aspect of the present invention, it is possible to provide a damper apparatus having a small number of parts.

DETAILED DESCRIPTION OF THE INVENTION

Hereinafter, embodiments of the present invention will be described with reference to the accompanying drawings. Throughout the description, left and right refer to left and right based on the occupant of the vehicle, and front and rear refer to front and rear based on the direction of travel of the vehicle. In the drawings, Fr indicates the front, Rr indicates the rear, Le indicates the left when viewed from the occupant, Ri indicates the right when viewed from the occupant, Up indicates the top, and Dn indicates the bottom. The form shown in the attached drawings is an example of the present invention, and the present invention is not limited to the form.

First Embodiment

Figure 1:
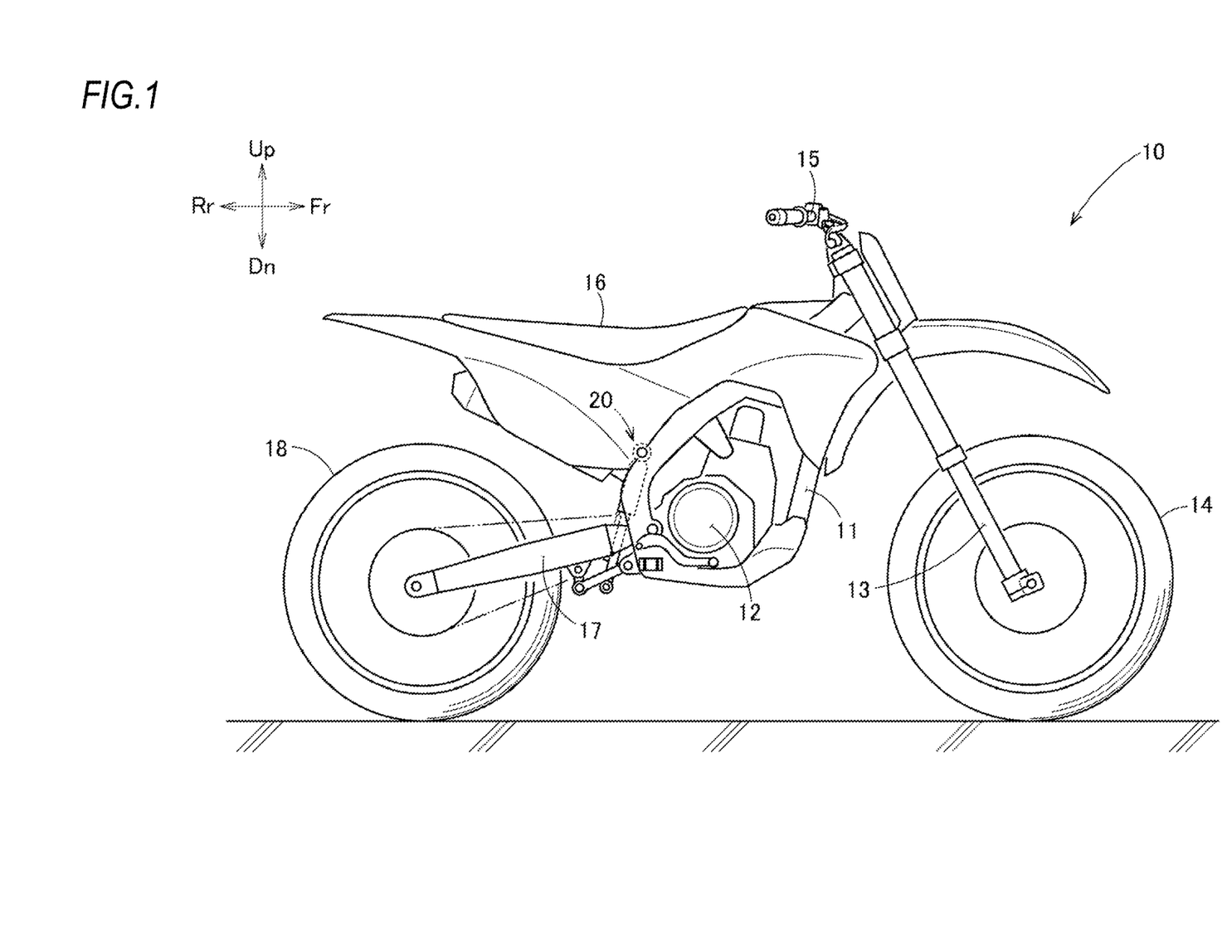
FIG. 1 is a side view showing a two-wheeled vehicle including a rear suspension according to a first embodiment.

Reference is made to FIG. 1. For example, a damper apparatus 20 is a rear suspension used in an off-road type motorcycle 10. Hereinafter, the damper apparatus 20 described herein is interchangeable with the rear suspension 20.

For example, the rear suspension 20 is a twin shock type rear suspension mounted on the left and right sides of the motorcycle 10. The present invention can also be applied to a monoshock type rear suspension.

The two-wheeled vehicle 10 (saddle-riding vehicle 10) includes a vehicle body 11, an engine 12 as a power source supported at a lower center of the vehicle body 11, left and right front forks 13 (only the right front fork 13 is shown in the drawing) provided on the left and right sides of the front of the vehicle body 11 to absorb the impact received from the irregularities of the road surface, a front wheel 14 interposed between and rotatably supported by these front forks 13, a handle pipe 15 disposed above the front fork 13 to steer the front wheels 14, a seat 16 provided above the engine 12 on which the occupant sits, a swing arm 17 extending rearward from a rear portion of the vehicle body 11 and capable of swinging in up and down directions, a rear wheel 18 rotatably supported by the swing arm 17, and left and right rear suspensions 20 (only the right rear suspension 20 is shown in the drawing) extending from the rear portion of the vehicle body 11 to the swing arm 17.

The left and right rear suspensions 20 have the same configuration. Hereinafter, the right rear suspension 20 will be described, and the description of the left rear suspension will be omitted.

The left and right rear suspensions 20 may have different configurations on the left and right sides depending on purposes.

Figure 2:
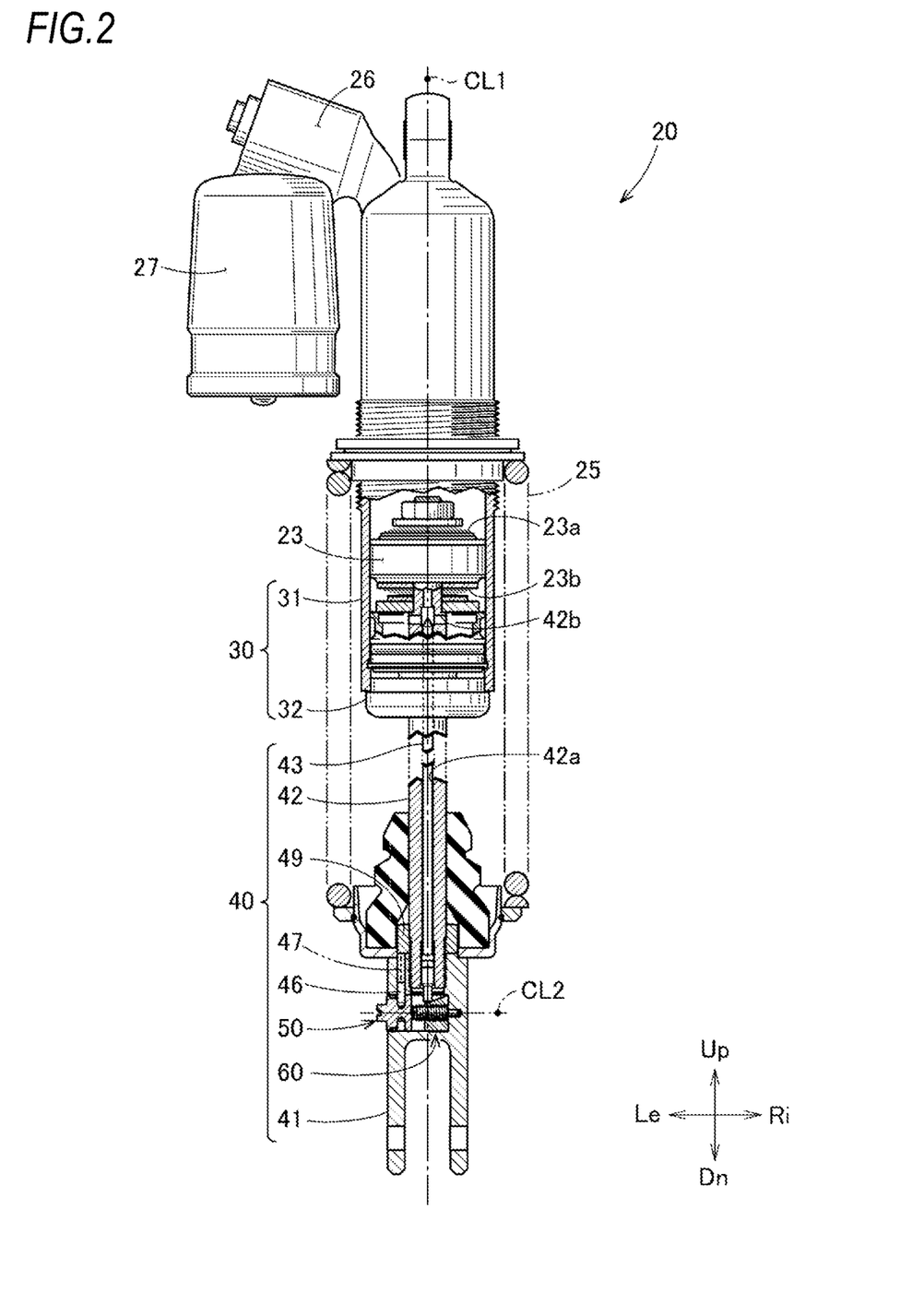
FIG. 2 is a cross-sectional view showing a main part of the rear suspension shown in FIG. 1.

Reference is made to FIG. 2. The rear suspension 20 includes a main body 30 including an upper end fixed to the vehicle body 11 (see FIG. 1) and filled with oil Oi therein, a rod unit 40 including a lower end fixed to the swing arm 17 (see FIG. 1) and provided to be movable forward and backward with respect to the main body 30, a piston 23 fixed to a tip of the rod unit 40 and facing the inside of the main body 30, a spring 25 that urges the main body 30 and the rod unit 40 to be separated from each other, a damping force generating means 26 connected to the main body 30 to generate damping force when the flow rate of oil Oi introduced from the main body 30 exceeds a predetermined flow rate, and a sub-tank 27 connected to the damping force generating means 26 and capable of storing oil Oi.

The main body 30 includes a tubular member 31 formed in a shape of a tube with an upper end (one end) closed, and a main body lid part 32 closing a lower end (the other end) of the tubular member 31. A part of the upper end of the main body 30 is formed with an opening and in communication with the damping force generating means 26.

Figure 3:
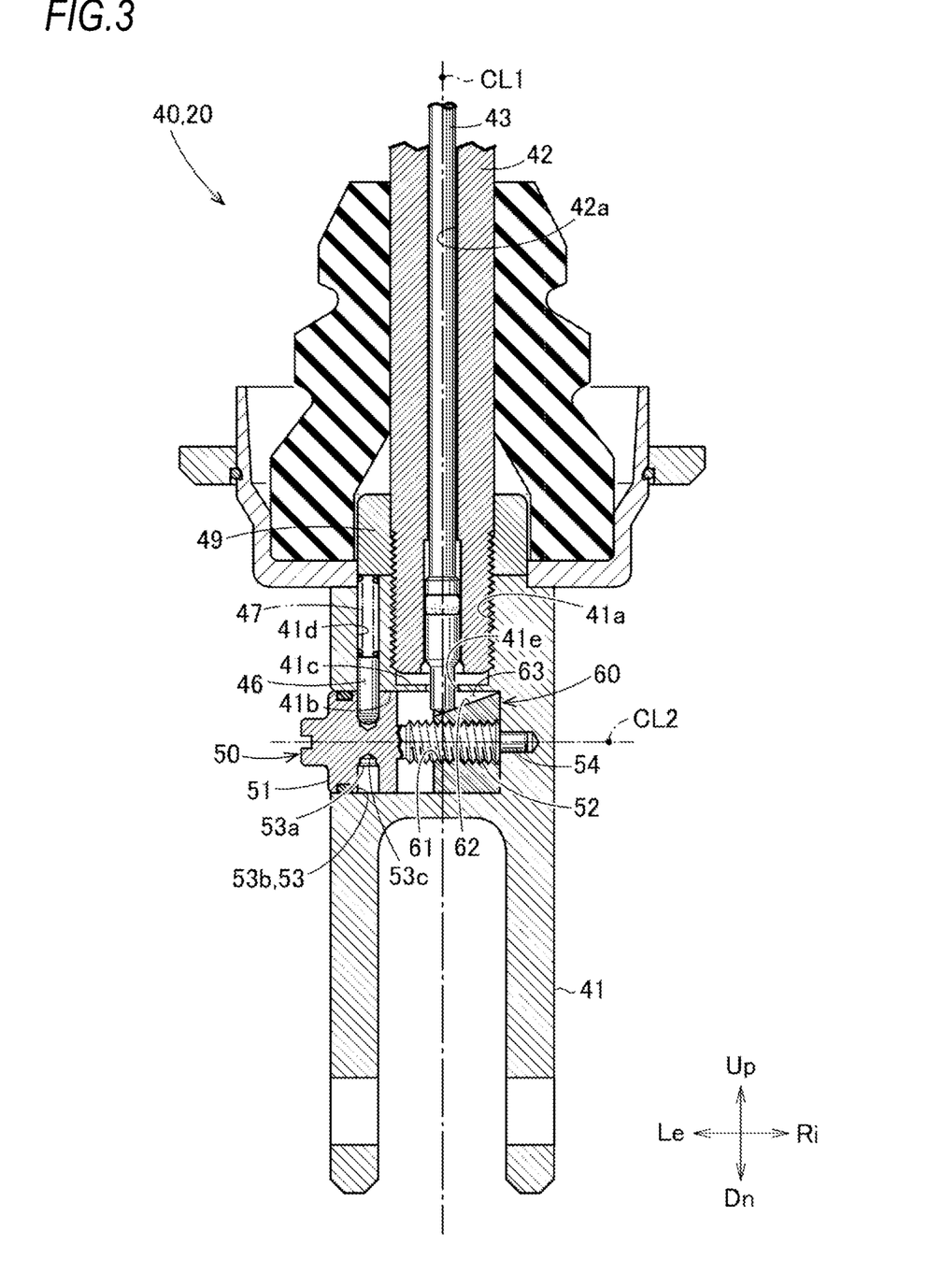
FIG. 3 is an enlarged view showing a main part of the rear suspension shown in FIG. 2.
Figure 4:
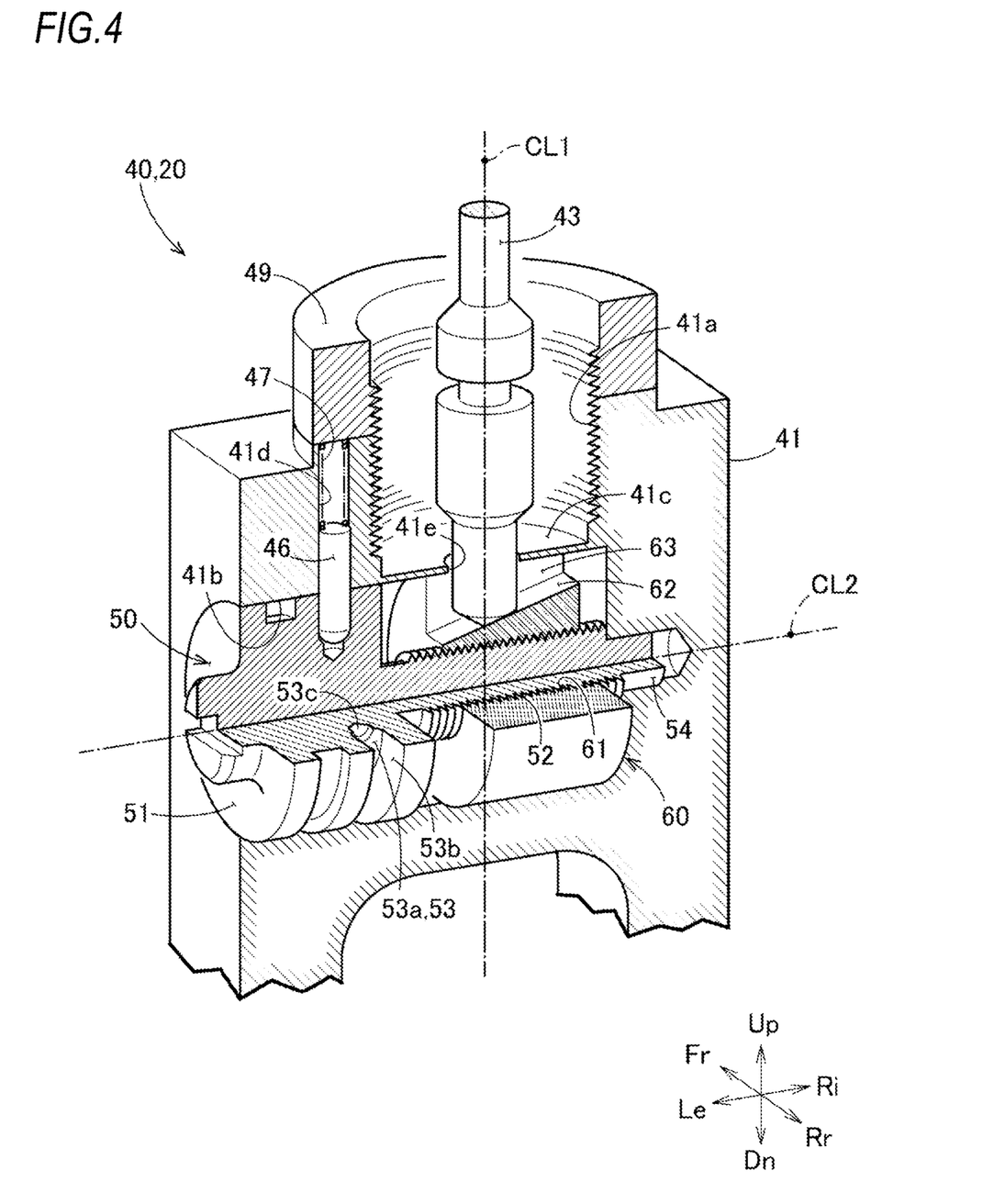
FIG. 4 is an enlarged perspective view showing a main part of the rear suspension shown in FIG. 3.

Reference is made to FIGS. 3 and 4. The rod unit 40 includes a base part 41 disposed outside the tubular member 31 (see FIG. 2) and formed in a fork shape to interpose the swing arm 17 (see FIG. 1) therebetween, a rod 42 supported by the base part 41 and provided along an axis line CL1 (hereinafter, referred to as "first axis line CL1") of the tubular member 31 (see FIG. 2), a push rod 43 provided inside the rod 42 and capable of advancing and retreating (moving up and down) inside the rod 42, an adjusting bolt 50 rotatably provided inside the base part 41 to adjust the position of the push rod 43, an adjusting member 60 fastened to the adjusting bolt 50 and coming into contact with the push rod 43, a retaining member 46 provided on the base part 41 to prevent the adjusting bolt 50 and the adjusting member 60 from coming off from the base part 41, an urging member 47 urging the retaining member 46 toward the adjusting bolt 50 and stored in the base part 41, and a lid 49 receiving the upper end of the urging member 47 and closing the upper end of the storage hole 41d.

The base part 41 includes a rod fixing part 41a opening on the first axis line CL1 and fixed at a lower end of the rod 42, an adjusting bolt storage part 41b opening perpendicularly to the first axis line CL1 and storing the adjusting bolt 50 and the adjusting member 60, a guide wall part 41c which partitions the rod fixing part 41a and the adjusting bolt storage part 41b and through which a lower end of the push rod 43 is passed in the center, and a storage hole part 41d opening in parallel to the first axis line CL1 and storing an upper part of the retaining member 46 and the urging member 47.

The rod fixing part 41a is a tubular hole including the guide wall part 41c as a bottom surface, and includes an inner peripheral surface formed in a female thread shape.

The adjusting bolt storage part 41b is a bottomed tubular hole opening perpendicularly to the first axis line CL1. That is, an axis line CL2 of the adjusting bolt 50 (hereinafter, referred to as "second axis line CL2") intersects the first axis line CL1 perpendicularly.

The guide wall part 41c has a push rod through hole 41e opening on the first axis line CL1. The push rod 43 penetrates the push rod through hole 41e. A diameter of the push rod through hole 41e is slightly greater than an outer diameter of the lower end of the push rod 43, such that the tilting of the push rod 43 in the radial direction is prevented.

The storage hole part 41d is opened in parallel with the first axis line CL1 and passes through from an upper surface of the base part 41 to the adjusting bolt storage part 41b.

Reference is also made to FIG. 2. A tip (upper end) of the rod 42 is located inside the tubular member 31. A base (lower end) of the rod 42 has an outer peripheral surface formed in a male thread shape and is fastened to the rod fixing part 41a formed in a female thread shape. A nut-shaped lid 49 is fastened to the portion formed in a male thread shape.

The rod 42 is formed with a vertical hole part 42a penetrating along the first axis line CL1 and a horizontal hole part 42b located inside the tubular member 31 and penetrating the vertical hole part 42a perpendicularly to the first axis line CL1.

Figure 5A:
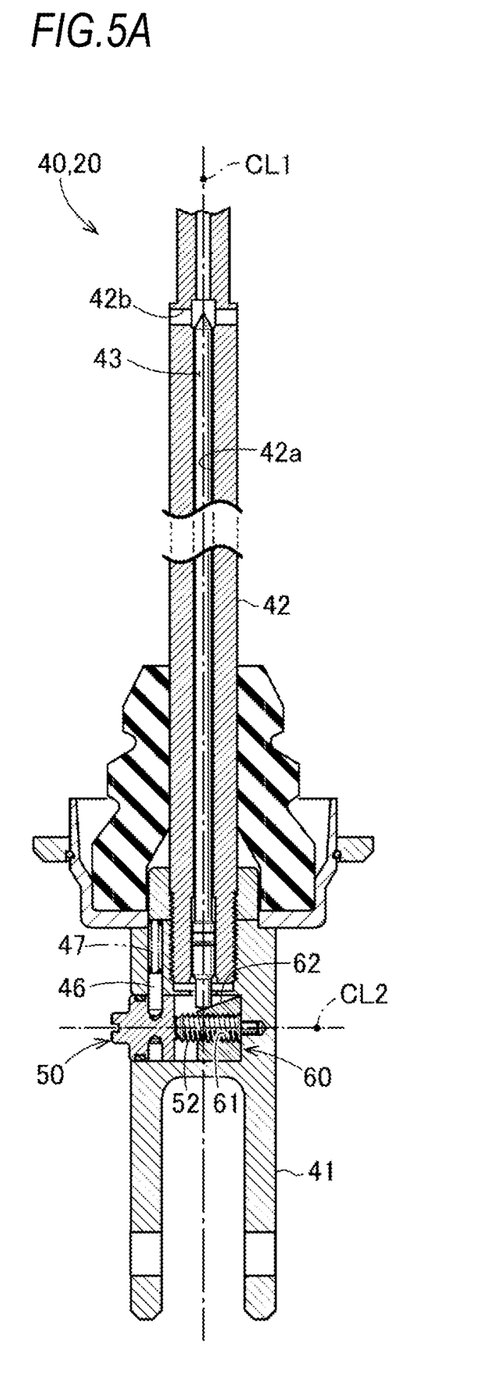
FIG. 5A is a view for explaining the rear suspension with a horizontal hole part fully open.
Figure 5B:
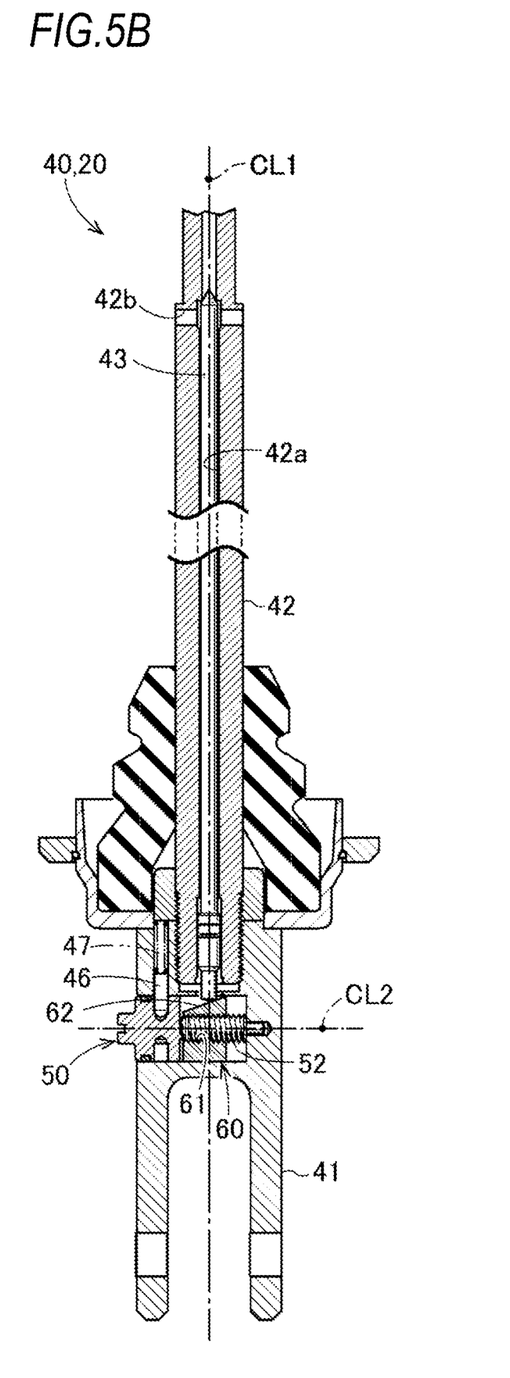
FIG. 5B is a view for explaining a rear suspension with a horizontal hole part completely closed.

Reference is made to FIGS. 5A and 5B. The push rod 43 is an elongated rod-shaped member having a needle valve at the tip (upper end). The lower end of the push rod 43 is in contact with the adjusting member 60. The push rod 43 is movably provided in the vertical hole part 42a along the first axis line CL1, and opens the horizontal hole part 42b when positioned at a retreat limit (see FIG. 5A), and closes the horizontal hole part 42b when positioned at an advance limit (see FIG. 5B). Accordingly, the flow rate of the oil flowing through the horizontal hole part 42b can be adjusted.

Reference is made to FIG. 4. The lower end of the push rod 43 is formed to gradually taper toward the adjusting member 60.

Reference is also made to FIG. 3. The adjusting bolt 50 includes a head part 51 facing an open end of the adjusting bolt storage part 41b, a male thread part 52 integrally extending from the head part 51 and formed in a male thread shape, a groove part 53 formed in a groove shape along a circumferential direction of the head part 51, and a bolt shaft part 54 formed at the tip of the male thread part 52 and inserted into the base part 41. The bolt shaft part 54 is rotatably supported by the base part 41.

Figure 6:
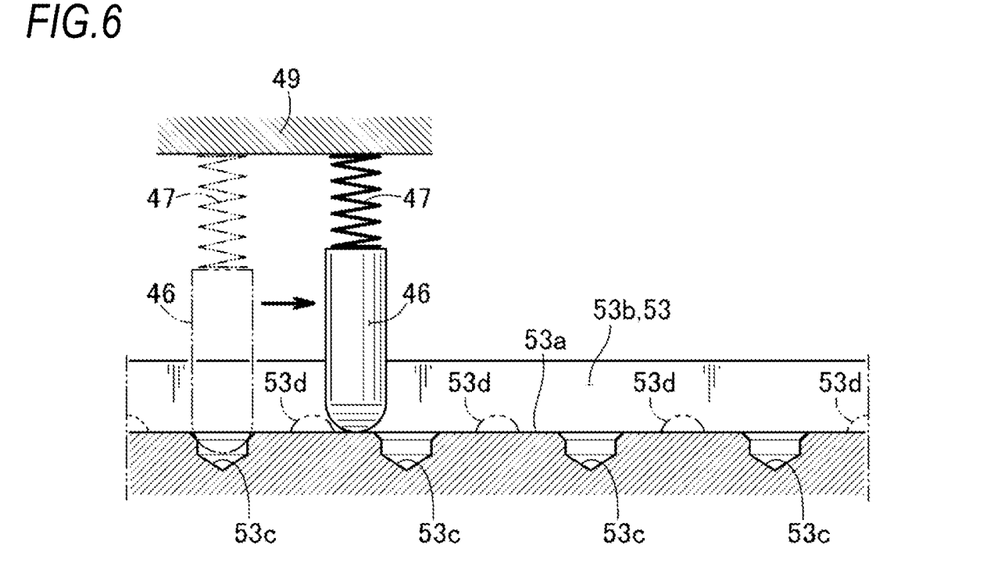
FIG. 6 is an expanded view showing the groove part shown in FIG. 4.

Reference is made to FIG. 6. FIG. 6 shows the expansion of the groove part 53. The groove part 53 opens outward in diameter (upward in the drawing), and includes a bottom surface 53*a* and side surfaces 53*b* rising from both ends of the bottom surface 53*a*. For example, four concave parts 53*c* are formed on the bottom surface 53*a* at equal intervals. Alternatively, instead of the concave parts 53*c*, convex parts 53*d* protruding from the bottom surface 53*a* or side surface 53*b* toward the retaining member 46 may be formed at equal intervals.

Reference is made to FIG. 4. The adjusting member 60 is a substantially cylindrical member fastened to the male thread part 52 of the adjusting bolt 50. The adjusting member 60 is moved along the second axis line CL2 by the rotation of the adjusting bolt 50. Meanwhile, when the adjusting bolt 50 is rotated, the adjusting member 60 is not rotated. That is, the adjusting member 60 is able to move only along the second axis line CL2.

Figure 7:
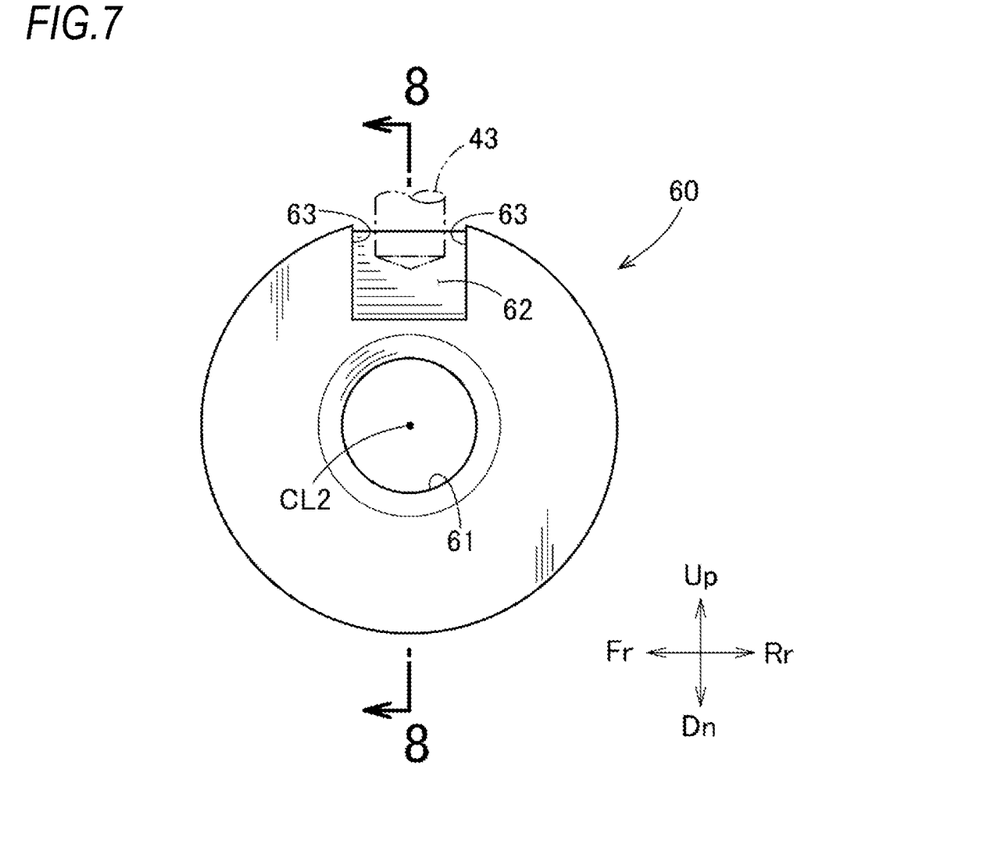
FIG. 7 is a view showing the adjusting member shown in FIG. 4 when viewed in the rear direction.
Figure 8:
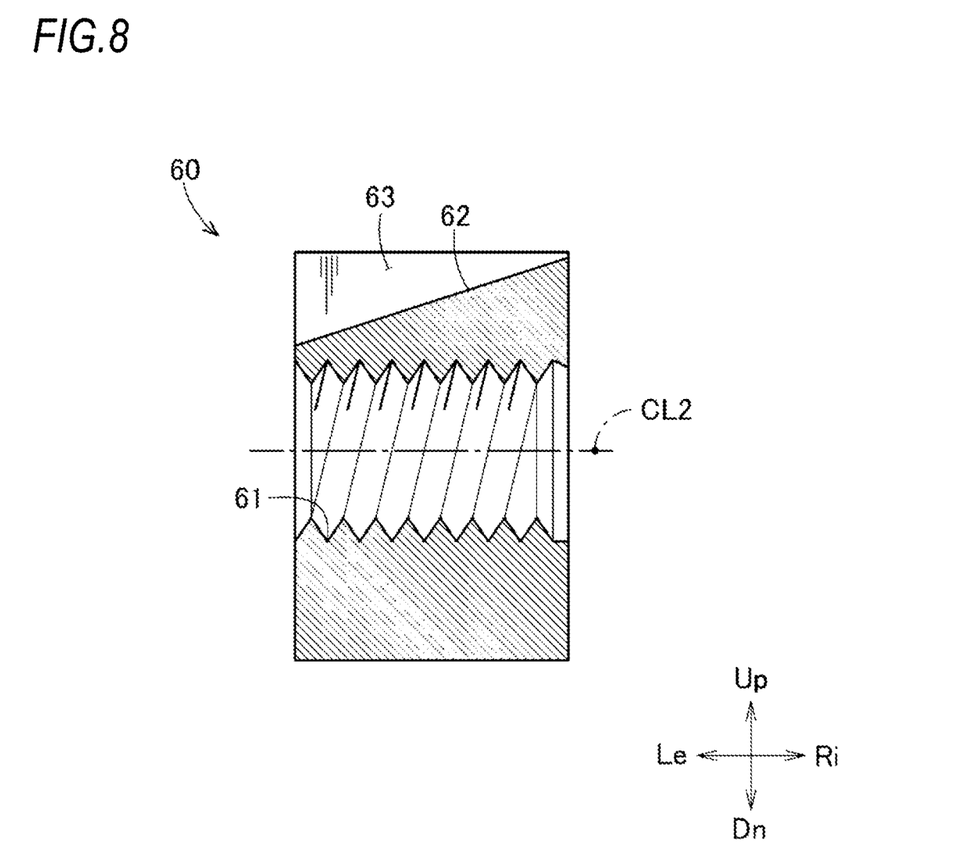
FIG. 8 is a cross-sectional view taken along line 8-8 of FIG. 7.

Reference is also made to FIGS. 7 and 8. The adjusting member 60 includes a female thread part 61 formed in a female thread shape and fastened to the male thread part 52, a tapered surface part 62 with which the tip of the push rod 43 comes into contact, and which is formed in a tapered shape with respect to the second axis line CL2, and wall parts 63 and 63 rising from both ends of the tapered surface part 62 with reference to the circumferential direction of the adjusting bolt 50 and interposing the push rod 43 therebetween.

Note that the tapered surface part 62 may be formed as a curved surface, rather than a flat surface extending linearly from lower to the upper ends.

Reference is made to FIGS. 4, 5A, and 5B. The retaining member 46 is a member that prevents the adjusting bolt 50 from coming off from the adjusting bolt storage part 41. The base part retaining member 46 is formed of a pin with a tip formed in a spherical shape. The upper part of the retaining member 46 is stored in the storage hole part 41*d*, and the tip thereof faces the groove part 53. That is, the retaining member 46 extends from the storage hole part 41*d* to the groove part 53. The retaining member 46 can come into contact with the concave part 53*c* or the convex part 53*d*.

The urging member 47 urges the retaining member 46 toward the bottom surface 53*a* of the groove part 53. The urging member 47 is in contact with the lid 49 at one end, and in contact with the retaining member 46 at the other end. While the details will be described below, a click mechanism is formed by the retaining member 46, the urging member 47, and the concave part 53*c* (or the convex part 53*d*).

Reference is made to FIG. 2. The piston 23 is a substantially tubular member through which the rod 42 is passed, and a plurality of holes are opened in parallel with the first axis line CL1. An upper surface and a lower surface of the piston 23 are closed by valve bodies 23*a* and 23*b* that are open by a predetermined hydraulic pressure.

The operation of the rear suspension 20 will be described below.

Reference is made to FIGS. 1 and 2. When the two-wheeled vehicle 10 is traveling, the rear wheel 18 and the swing arm 17 may swing in the vertical direction due to the influence of irregularities on the road surface or the like. In such a case, the rod unit 40 fixed to the swing arm 17 is displaced along the first axis line CL1 with respect to the main body 30 fixed to the vehicle body 11. With reference to the main body 30, the rod unit 40 is moved upward against the urging force of the spring 25 and is moved downward due to the urging force of the spring 25.

When the rod 42 is moved up, a predetermined hydraulic pressure is applied to the valve body 23*b* provided on the lower surface of the piston 23, and the valve body 23*b* is opened. When the rod 42 is moved down, a predetermined hydraulic pressure is applied to the valve body 23*a* provided on the upper surface of the piston 23, and the valve body 23*a* is opened.

The damping force generated here can be adjusted by controlling the flow rate of the oil flowing through the vertical hole part 42*a* and the horizontal hole part 42*b*. More specifically, the damping force is adjusted by adjusting the degree of opening of the horizontal hole part 42*b*.

Reference is made to FIG. 5A. In the state shown in FIG. 5A, the horizontal hole part 42*b* is in the fully open state. That is, here, the flow rate of the oil passing through the vertical hole part 42*a* and the horizontal hole part 42*b* is maximized Therefore, the flow rate of the oil passing through the piston 23 (see FIG. 2) is minimized, and the generated damping force is also minimized.

Reference is also made to FIG. 5B. By the rotation of the adjusting bolt 50 in one direction from the state shown in FIG. 5A, the adjusting member 60 is moved to the left in the drawing along the second axis line CL2. As a result, the lower end of the push rod 43 is gradually moved from the lowest position of the tapered surface part 62 to be in contact with a higher position. The push rod 43 is pushed upward by the tapered surface part 62. As the rotation of the adjusting bolt 50 in one direction continues, the upper end of the push rod 43 is in contact with an edge of the vertical hole part 42*a*. As shown in FIG. 5B, the horizontal hole part 42*b* is completely closed.

When the horizontal hole part 42*b* is completely closed, the flow rate of oil passing through the vertical hole part 42*a* and the horizontal hole part 42*b* is minimized (oil does not pass through). Therefore, the flow rate of the oil flowing through the piston 23 (see FIG. 2) is maximized, and the generated damping force is also maximized.

In the state shown in FIG. 5B, the push rod 43 is restricted from moving up by the edge of the vertical hole part 42*a*. Therefore, even when torque is applied to the adjusting bolt 50 in one direction, the adjusting bolt 50 is not rotated.

From the state shown in FIG. 5B, when the damping force is reduced, the adjusting bolt 50 is rotated in the opposite direction. As a result, the adjusting member 60 is moved to the right in the drawing. The push rod 43 is pushed downward by gravity or hydraulic pressure. As a result, the degree of opening of the horizontal hole part 42*b* is increased, and the damping force can be reduced.

Reference is also made to FIG. 6. When the adjusting bolt 50 is rotated, the groove part 53 is also rotated. On the other hand, when the adjusting bolt 50 is rotated, the retaining member 46 is not rotated. Relatively, it can be said that when the adjusting bolt 50 is rotated, the retaining member 46 is displaced with respect to the groove part 53.

The concave parts 53*c* are formed in the groove part 53 at regular intervals. Therefore, by the continued rotation of the adjusting bolt 50, the tip of the retaining member 46 is fit into and exits from the concave part 53*c* at regular intervals. Here, vibration is transmitted to the hands of the operator who rotates the adjusting bolt 50. As a result, the operator can check the degree of rotation of the adjusting bolt 50. That is, the retaining member 46, the urging member 47, and the concave part 53c play the role of a click mechanism. The same applies to the convex part 53.

The rear suspension 20 will be described below.

Reference is made to FIGS. 2 and 3. The rear suspension 20 includes the tubular member 31 filled with oil inside, the base part 41 disposed outside the tubular member 31, movably provided on the first axis line CL1 and including an adjusting bolt storage part 41b opening perpendicularly to the first axis line CL1, the rod 42 supported by the base part 41 and provided along the first axis line CL1, the rod including the tip located inside the tubular member 31 and formed with the vertical hole part 42a penetrating along the first axis line CL1 and the horizontal hole part 42b located inside the tubular member 31 and penetrating perpendicularly to the first axis line CL1, the piston 23 provided at the tip of the rod 42 and generating a damping force when the rod 42 is moved forward and backward, the spring 25 urging the tubular member 31 and the base part 41 to be separated from each other, the push rod 43 movably provided in the vertical hole part 42a along the first axis line CL1, opening the horizontal hole part 42b when positioned at a retreat limit, and closing the horizontal hole part 42b when positioned at an advance limit, the adjusting bolt 50 including the head part 51 rotatably stored in the adjusting bolt storage part 41b and the tip being the male thread part 52 formed in the male thread shape, and the adjusting member 60 including a female thread part 61, which is a part having a female thread shape and fastened to the male thread part 52 of the adjusting bolt 50 and movably provided along the second axis line CL2, the tapered surface part 62 with which the tip of the push rod 43 comes into contact and which is formed in the tapered shape with respect to the second axis line CL2, and the wall part 63 rising from both ends of the tapered surface part 62 with reference to the circumferential direction of the adjusting bolt 50 and interposing the push rod 43 therebetween.

Reference is made to FIGS. 4 and 7. The adjusting member 60 includes the wall part 63 rising from both ends of the tapered surface part 62 and interposing the push rod 43 therebetween. The adjusting member 60 is moved along the second axis line CL2 by the rotation of the adjusting bolt 50. The tapered surface part 62 is moved with respect to the push rod 43 as the adjusting member 60 is moved. The push rod 43 in contact with the tapered surface part 62 advances or retreats as the tapered surface part 62 is moved. Meanwhile, when the adjusting bolt 50 is rotated and the adjusting member 60 is rotated by a predetermined amount, the wall part 63 is brought into contact with the push rod 43. Further rotation of the adjusting member 60 is prevented. The rotation of the adjusting member 60 can be prevented by the wall parts 63 rising from both ends of the tapered surface part 62. Since it is not necessary to prepare a separate component to prevent the adjusting member 60 from rotating, the rear suspension 20 having a small number of parts can be provided.

The adjusting bolt 50 has the groove part 53 formed in the groove shape in the circumferential direction and including the concave parts 53c formed at predetermined intervals on the bottom surface 53a, the base part 41 has the storage hole part 41d opening along the first axis line CL1 and facing the groove part 53, and the storage hole part 41d stores the retaining member 46 extending to the groove part 53 and preventing the adjusting bolt 50 from coming off from the base part 41 and the urging member 47 urging the retaining member 46 toward the bottom surface 53a of the groove part 53.

Alternatively, the adjusting bolt 50 includes the groove part 53 formed in the groove shape in the circumferential direction and including the convex parts 53d formed at predetermined intervals on the bottom surface 53a or the side surface 53b, the base part 41 has the storage hole part 41d opening along the first axis line CL1 and facing the groove part 53, and the storage hole part 41d stores the retaining member 46 extending to the groove part 53 and preventing the adjusting bolt 50 from coming off from the base part 41 and the urging member 47 urging the retaining member 46 toward the bottom surface 53a of the groove part 53.

A part of the retaining member 46 is located in the storage hole part 41d, and the rest is located in the groove part 53. When a force is applied to the adjusting bolt 50 in the direction of exiting the adjusting bolt storage part 41b, the retaining member 46 prevents the slip of the adjusting bolt 50. Meanwhile, the retaining member 46 is urged toward the bottom surface 53a of the groove part 53. When the operator rotates the adjusting bolt 50, the retaining member 46 comes into contact with the concave part 53c (with the convex part 53d when the convex part 53d is formed. Hereafter, the same applies as the paragraph here.). When the adjusting bolt 50 is further rotated, the retaining member 46 is separated from the concave part 53c. Here, the feeling of clicking is transmitted to the operator. As a result, the operator can recognize the degree of rotation of the adjusting bolt 50 and can check the position of the push rod 43. In other words, the click mechanism is used to prevent the slip of the adjusting bolt 50. In order to prevent the slip of the adjusting bolt 50, it is not necessary to provide a special part such as a retaining bolt. It is possible to provide the rear suspension 20 capable of preventing the slip of the adjusting bolt 50 with a small number of parts.

The tip of the retaining member 46 is formed in the spherical shape. Therefore, after the tip of the retaining member 46 enters the concave part 53c, the tip of the retaining member 46 can smoothly exit from the concave part 53c. Accordingly, it is not necessary to apply an excessive torque to the adjusting bolt 50, and the work of adjusting the damping force can be smoothly performed.

Next, a second embodiment of the present invention will be described with reference to the drawings.

Second Embodiment

Figure 9:
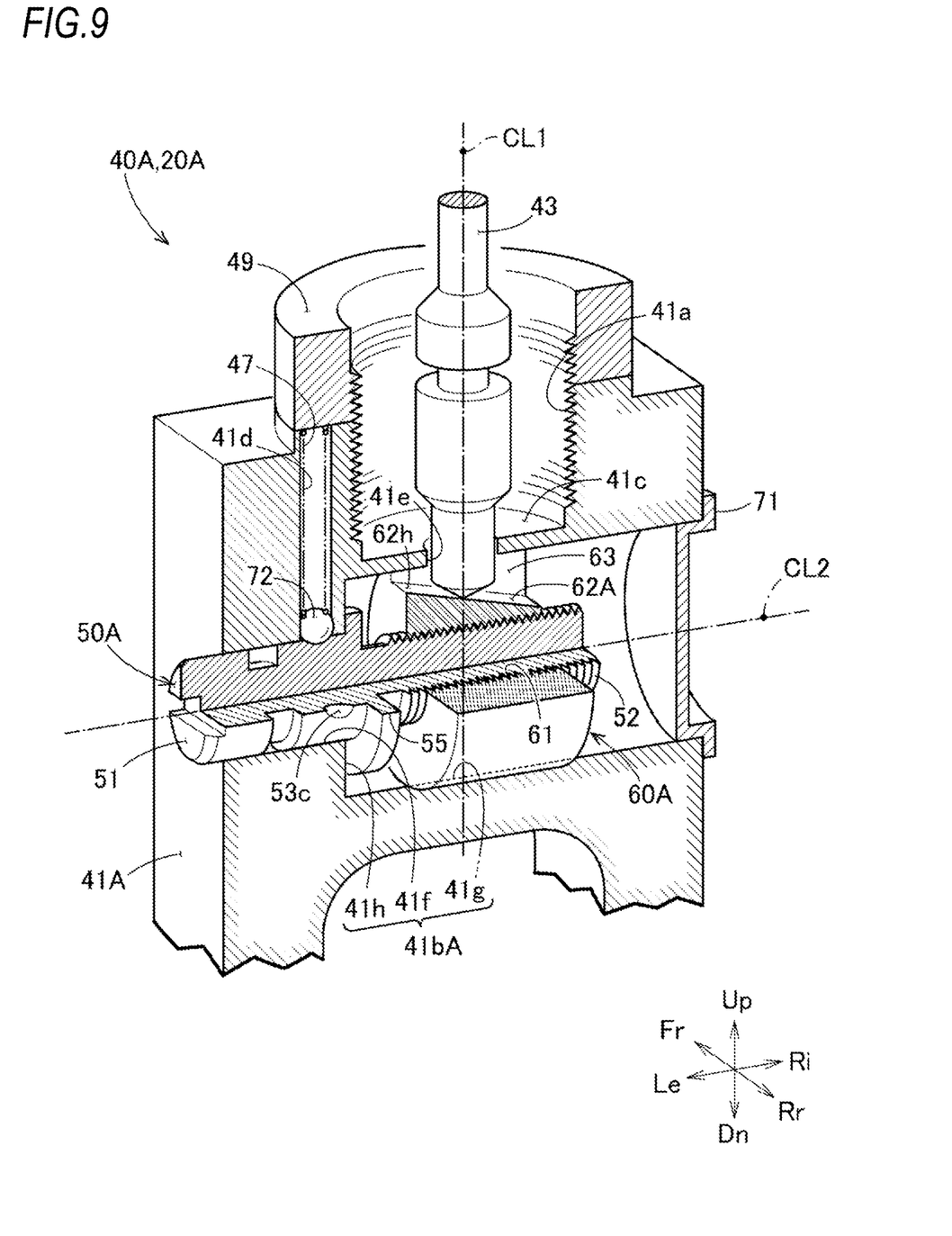
FIG. 9 is an enlarged perspective view showing a main part of the rear suspension according to a second embodiment.

FIG. 9 shows a rear suspension 20a according to the second embodiment. The configuration of a rod unit 40A is different from that of the rear suspension 20 (see FIG. 2) shown in the first embodiment. Other basic configurations are the same as those of the rear suspension 20 according to the first embodiment. The same parts as those of first embodiment will be denoted by the same reference numerals, and detailed description thereof will be omitted.

An adjusting bolt storage part 41bA penetrates the base part 41A. The adjusting bolt storage part 41bA includes a small-diameter hole part 41f being a cylindrical hole storing the head part 51, and a large-diameter hole part 41f being a cylindrical hole storing the male thread part 52 and having a larger inner diameter than that of the small-diameter hole 41*f*, and a stepped portion 41*h* formed at a boundary between the small-diameter hole part 41*f* and the large-diameter hole part 41*g*.

An end of the large-diameter hole part 41*g* is closed by a large-diameter hole part lid 71.

An adjusting bolt 50A includes a flange part 55 radially protruding between the head part 51 and the male thread part 52, and being larger than the inner diameter of the small-diameter hole part 41*f* and smaller than the inner diameter of the large-diameter hole part 41*g*. The flange part 55 can come into contact with the stepped portion 41*h*. The adjusting bolt 50A is formed without the groove part 53, that is, formed with only the concave part 53*c* (see FIG. 4).

In the adjusting member 60A, the tapered surface part 62A is formed with a downward slope in a direction away from the flange part 55. It can also be said that the tapered surface part 62A is formed with a downward slope in a direction away from the head part 51 of the adjusting bolt 50A.

A ball 72 is stored in the storage hole part 41*b*. The ball 72 is pressed toward an outer peripheral surface of the adjusting bolt 50A by the urging member 47. The click mechanism is formed of the ball 72, the urging member 47, and the concave part 53*c*.

The groove part 53 (see FIG. 4) may be formed in the adjusting bolt 50A and the retaining member 46 (see FIG. 4) may be used instead of the ball 72. Here, as described above, the retaining member can also prevent the slip of the adjusting bolt 50A and the adjusting member 60A.

The rear suspension 20A described above also has the predetermined effects of the present invention.

The base part 41A includes a small-diameter hole part 41*f* being a cylindrical hole storing the head part 51, and a large-diameter hole part 41*g* being a cylindrical hole storing the male thread part 52 and having an inner diameter larger than that of the small-diameter hole part 41*f*, the adjusting bolt 50A includes the flange part 55 radially protruding between the head part 51 and the male thread part 52 and being larger than the inner diameter of the small-diameter hole part 41*f* and smaller than the inner diameter of the large-diameter hole part 41*g*, the flange part 55 can come into contact with the stepped portion 41*h* formed at a boundary between the small-diameter hole part 41*f* and the large-diameter hole part 41*g*, and the tapered surface part 62A is formed with a downward slope in a direction away from the flange part 55.

The flange part 55 comes into contact with the stepped portion 41*h* to prevent the adjusting bolt 50A from coming off in one direction (left direction in the drawing). The adjusting member 60A, the push rod 43, and the rod 42 prevent the adjusting bolt 50A from coming off in the other direction (right direction in the drawing) opposite to the one direction. When the push rod 43 is in contact with the highest portion 62*h* of the tapered surface part 62, the push rod 43 closes the horizontal hole part 42*b* (see FIG. 5B). Here, when a force to move in the other direction is applied to the adjusting bolt 50A, a force to move in the other direction is also applied to the adjusting member 60A. As a result, the force is applied to the push rod 43 via the tapered surface part 62A in the direction of closing the horizontal hole part 42*b*. However, the push rod 43 closes the horizontal hole part 42*b*, and is restricted from further advancing (moving up) by the rod 42 (see FIG. 5B). Therefore, the movement of the adjusting member 60A and the adjusting bolt 50A in the other direction is restricted via the push rod 43. It is possible to prevent the slip of the adjusting bolt 50A without increasing the number of parts. It is possible to provide the rear suspension 20A capable of preventing the slip of the adjusting bolt 50A from coming off with a small number of parts.

Next, a third embodiment of the present invention will be described with reference to the drawings.

Third Embodiment

Figure 10:
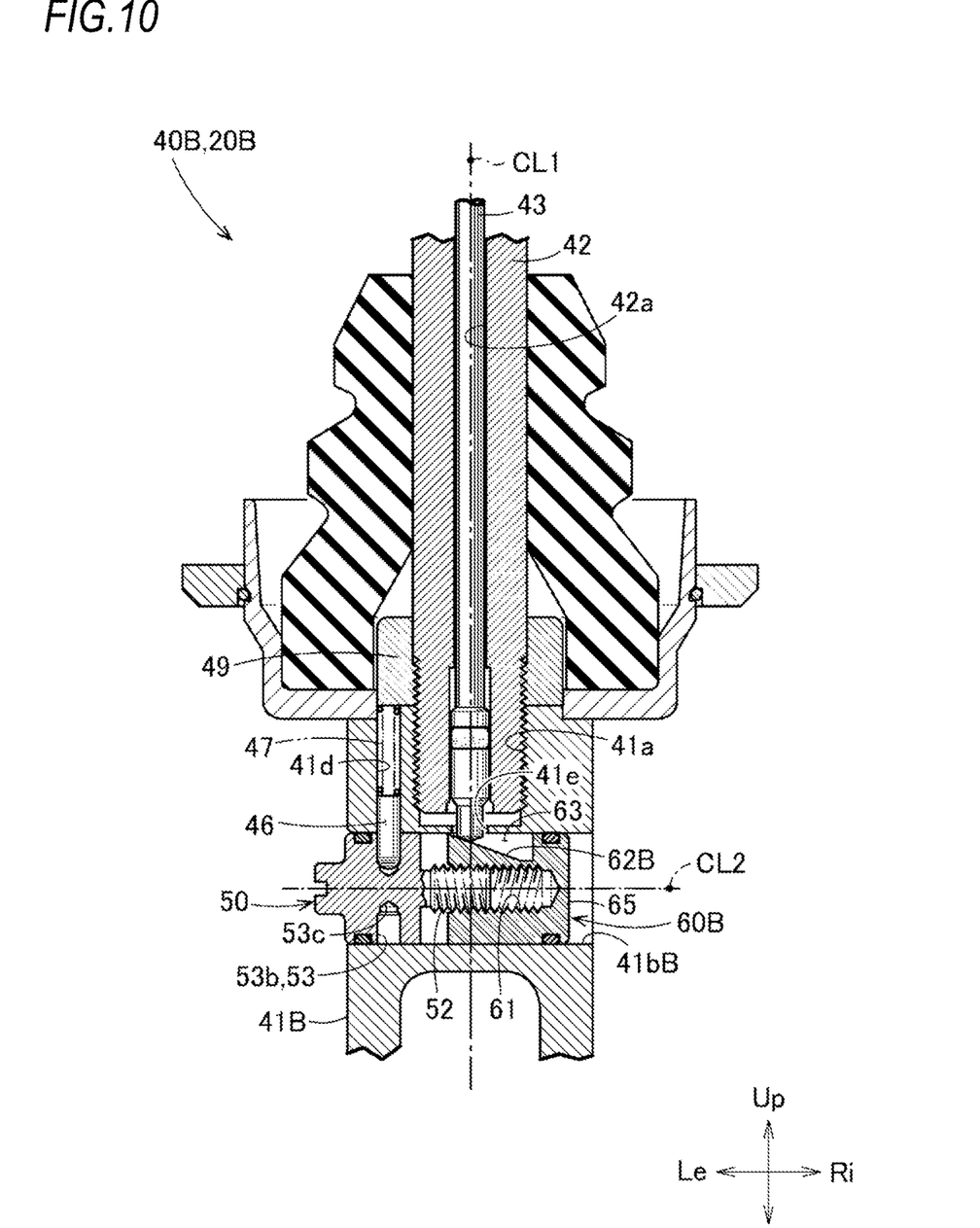
FIG. 10 is an enlarged cross-sectional view showing a main part of the rear suspension according to a third embodiment.

FIG. 10 shows a rear suspension 20B according to the third embodiment. The configuration of a rod unit 40B is different from that of the rear suspension 20 (see FIG. 2) shown in the first embodiment. Other basic configurations are the same as those of the rear suspensions 20 and 20A (see FIGS. 2 and 9) according to the first and/or second embodiments. The same parts as those of first and/or the second embodiment will be denoted by the same reference numerals, and detailed description thereof will be omitted.

An adjusting bolt storage part 41*b*B is a tubular hole having the same diameter as a whole, and penetrates the base part 41B.

A lid part 65 is integrally formed at a tip of the adjusting member 60B. A tapered surface part 62B is formed with a downward slope toward the lid part 65. It can also be said that the tapered surface part 62B is formed with a downward slope in a direction away from the head part 51 of the adjusting bolt 50.

One end (left end in the drawing) of the adjusting bolt storage part 41*b*B is closed by the head part 51, and the other end (right end in the drawing) of the adjusting bolt storage part 41*b*B is closed by the lid part 65.

The rear suspension 20B described above also has predetermined effects of the present invention.

The adjusting bolt storage part 41*b*B penetrates the base part 41B, one end of the adjusting bolt storage part 41*b*B is closed by the head part 51, and the other end of the adjusting bolt storage part 41*b*B is closed by the lid part 65 integrally formed with the tip of the adjusting member 60B.

To store the adjusting bolt 50 and the adjusting member 60B in the penetrating adjusting bolt storage part 41*b*, the assembly work and the adjusting work can be performed from both ends of the adjusting bolt storage part 41*b*. The workability of the operations can be improved. Since the lid part 65 is integrally formed at the tip of the adjusting member 60, an increase in the number of parts can also be prevented.

The tapered surface part 62B is formed with the downward slope toward the lid part 65. When the tapered surface part 62B is formed with an upward slope toward the lid part 65, there is a concern that the adjusting member 60B may come off from the adjusting bolt 50 and the adjusting member 60 may come off from the adjusting bolt storage part 41*b*. When the tapered surface part 62 is formed with the downward slope toward the lid part 65, the movement in the other direction is restricted by the push rod 43 and the rod 42. It is possible to prevent the slip of the adjusting member 60B. Even when the adjusting bolt storage part 41*b* is formed as a through hole, it is possible to prevent the slip of the adjusting member 60B without increasing the number of parts.

Although the damper apparatus according to the present invention has been described by taking the rear suspension of a two-wheeled vehicle as an example, the damper apparatus can be applied to vehicles other than two-wheeled vehicles and front suspensions, and is not limited to the above types.

The embodiments can be combined as appropriate, and the present invention is not limited to the embodiments. That is, the present invention is not limited to the embodiments as long as the actions and effects of the present invention are achieved.

The damper apparatus of the present invention may be suitable for the rear suspension of a two-wheeled vehicle.

The invention claimed is:

1. A damper apparatus, comprising:
a tubular member filled with oil inside;
a base part disposed outside the tubular member, movably provided on an axis line of the tubular member, and including an adjusting bolt storage part opening perpendicularly to the axis line of the tubular member;
a rod supported by the base part and provided along the axis line of the tubular member, the rod including a tip located inside the tubular member and formed with a vertical hole part penetrating along the axis of the tubular member and a horizontal hole part located inside the tubular member and penetrating perpendicularly to the axis line of the tubular member;
a piston provided at the tip of the rod to generate a damping force when the rod is moved forward and backward;
a spring urging the tubular member and the base part to be separated from each other;
a push rod movably provided in the vertical hole part along the axis line of the tubular member, opening the horizontal hole part when positioned at a retreat limit, and closing the horizontal hole part when positioned at an advance limit;
an adjusting bolt including a head part rotatably stored in the adjusting bolt storage part and a tip being a male thread part formed in a male thread shape; and
an adjusting member including a female thread part, which is a part in a female thread shape fastened to the male thread part of the adjusting bolt and movably provided along an axis line of the adjusting bolt, a tapered surface part with which a tip of the push rod comes into contact and which is formed in a tapered shape with respect to the axis line of the adjusting bolt, and wall parts rising from both ends of the tapered surface part with reference to a circumferential direction of the adjusting bolt and interposing the push rod therebetween, wherein
the adjusting bolt includes a groove part formed in a groove shape in the circumferential direction and including concave parts formed at predetermined intervals on a bottom surface,
the base part includes a storage hole part opening along the axis line of the tubular member and facing the groove part,
the storage hole part stores a retaining member extending to the groove part and preventing the adjusting bolt from coming off from the base part and an urging member urging the retaining member toward the bottom surface of the groove part, and
the retaining member comprises a pin formed in a tubular shape and a tip formed in a spherical shape.

2. The damper apparatus according to claim 1, wherein the adjusting bolt storage part penetrates the base part, one end of the adjusting bolt storage part is closed by the head part, and
the other end of the adjusting bolt storage part is closed by a lid part integrally formed with a tip of the adjusting member.

3. The damper apparatus according to claim 2, wherein the tapered surface part is formed with a downward slope toward the lid part.

4. The damper apparatus according to claim 1, wherein the adjusting bolt storage part penetrates the base part,
one end of the adjusting bolt storage part is closed by the head part, and
the other end of the adjusting bolt storage part is closed by a lid part integrally formed with a tip of the adjusting member.

5. The damper apparatus according to claim 4, wherein the tapered surface part is formed with a downward slope toward the lid part.

6. The damper apparatus according to claim 1, wherein the adjusting bolt storage part penetrates the base part,
one end of the adjusting bolt storage part is closed by the head part, and
the other end of the adjusting bolt storage part is closed by a lid part integrally formed with a tip of the adjusting member.

7. The damper apparatus according to claim 6, wherein the tapered surface part is formed with a downward slope toward the lid part.

8. The damper apparatus according to claim 1, wherein the tip of the retaining member is configured to fit into the concave parts and exit from the concave parts in a state where the pin is in the storage hole part and the groove part.

9. A damper apparatus, comprising:
a tubular member filled with oil inside;
a base part disposed outside the tubular member, movably provided on an axis line of the tubular member, and including an adjusting bolt storage part opening perpendicularly to the axis line of the tubular member;
a rod supported by the base part and provided along the axis line of the tubular member, the rod including a tip located inside the tubular member and formed with a vertical hole part penetrating along the axis of the tubular member and a horizontal hole part located inside the tubular member and penetrating perpendicularly to the axis line of the tubular member;
a piston provided at the tip of the rod to generate a damping force when the rod is moved forward and backward;
a spring urging the tubular member and the base part to be separated from each other;
a push rod movably provided in the vertical hole part along the axis line of the tubular member, opening the horizontal hole part when positioned at a retreat limit, and closing the horizontal hole part when positioned at an advance limit;
an adjusting bolt including a head part rotatably stored in the adjusting bolt storage part and a tip being a male thread part formed in a male thread shape; and
an adjusting member including a female thread part, which is a part in a female thread shape fastened to the male thread part of the adjusting bolt and movably provided along an axis line of the adjusting bolt, a tapered surface part with which a tip of the push rod comes into contact and which is formed in a tapered shape with respect to the axis line of the adjusting bolt, and wall parts rising from both ends of the tapered surface part with reference to a circumferential direction of the adjusting bolt and interposing the push rod therebetween, wherein the adjusting bolt includes a groove part formed in a groove shape in the circumferential direction and including convex parts formed at predetermined intervals on a bottom surface or a side surface, the base part includes a storage hole part opening along the axis line of the tubular member and facing the groove part, the storage hole part stores a retaining member extending to the groove part and preventing the adjusting bolt from coming off from the base part and an urging member urging the retaining member toward the bottom surface of the groove part, and the retaining member comprises a pin formed in a tubular shape and a tip formed in a spherical shape.

10. The damper apparatus according to claim 9, wherein the adjusting bolt storage part penetrates the base part, one end of the adjusting bolt storage part is closed by the head part, and the other end of the adjusting bolt storage part is closed by a lid part integrally formed with a tip of the adjusting member.

11. The damper apparatus according to claim 10, wherein the tapered surface part is formed with a downward slope toward the lid part.

12. The damper apparatus according to claim 9, wherein the tip of the retaining member is configured to fit into the concave parts and exit from the concave parts in a state where the pin is in the storage hole part and the groove part.

13. A damper apparatus, comprising:

a tubular member filled with oil inside;

a base part disposed outside the tubular member, movably provided on an axis line of the tubular member, and including an adjusting bolt storage part opening perpendicularly to the axis line of the tubular member and a storage hole part opening in parallel to the axis line of the tubular member;

a rod supported by the base part and provided along the axis line of the tubular member, the rod including a tip located inside the tubular member and formed with a vertical hole part penetrating along the axis of the tubular member and a horizontal hole part located inside the tubular member and penetrating perpendicularly to the axis line of the tubular member;

a piston provided at the tip of the rod to generate a damping force when the rod is moved forward and backward;

a spring urging the tubular member and the base part to be separated from each other;

a push rod movably provided in the vertical hole part along the axis line of the tubular member, opening the horizontal hole part when positioned at a retreat limit, and closing the horizontal hole part when positioned at an advance limit;

an adjusting bolt including a head part rotatably stored in the adjusting bolt storage part, a male thread part including a tip formed in a male thread shape, and a groove part formed in a groove shape in a circumferential direction, wherein a bottom surface of the groove part is formed with concave parts concaved toward a center at predetermined intervals;

an adjusting member including a female thread part fastened to the male thread part of the adjusting bolt and movably provided along an axis line of the adjusting bolt, a tapered surface part with which a tip of the push rod comes into contact and which is formed in a tapered shape with respect to the axis line of the adjusting bolt, and wall parts rising from both ends of the tapered surface part with reference to a circumferential direction of the adjusting bolt and interposing the push rod therebetween;

a retaining member including a base stored in the storage hole part and a tip formed in a spherical shape and stored in the groove part to prevent the adjusting bolt from coming off from the base part;

an urging member stored in the storage hole part and urging the retaining member toward the bottom surface of the groove part, and the retaining member comprises a pin formed in a tubular shape and a tip formed in a spherical shape.

* * * * *